(12) United States Patent
Hsu et al.

(10) Patent No.: US 12,517,606 B2
(45) Date of Patent: Jan. 6, 2026

(54) LIGHTING TOUCHPAD WITH SENSING ELECTRODE LAYOUT WITH LIGHTING DEVICES EVENLY DISTRIBUTED

(71) Applicant: PIXART IMAGING INC., Hsin-Chu (TW)

(72) Inventors: Che-Chia Hsu, Hsin-Chu (TW); Chi-Chieh Liao, Hsin-Chu (TW); Yu-Han Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/735,474

(22) Filed: Jun. 6, 2024

(65) Prior Publication Data

US 2024/0319815 A1    Sep. 26, 2024

Related U.S. Application Data

(60) Continuation-in-part of application No. 17/897,722, filed on Aug. 29, 2022, now Pat. No. 12,175,047, and
(Continued)

(30) Foreign Application Priority Data

Apr. 9, 2021 (CN) .......................... 202110382812.7
Dec. 23, 2021 (CN) .......................... 202111588194.8

(51) Int. Cl.
*G06F 3/041* (2006.01)
*G06F 3/044* (2006.01)
*H01L 25/075* (2006.01)

(52) U.S. Cl.
CPC .......... *G06F 3/0416* (2013.01); *G06F 3/0445* (2019.05); *H01L 25/0753* (2013.01)

(58) Field of Classification Search
CPC .... G06F 3/0416; G06F 3/0445; G06F 3/0443; G06F 3/0448; G06F 3/0446; G06F 2203/04111; H01L 25/0753; H01L 25/167
See application file for complete search history.

(56) References Cited

U.S. PATENT DOCUMENTS 11,687,187 B2    6/2023    Liao
12,093,480 B2    9/2024    Liao
(Continued)

FOREIGN PATENT DOCUMENTS

CN    110310977 A    10/2019
CN    111984141 A    11/2020
CN    112534384 A    3/2021

OTHER PUBLICATIONS

USPTO, Office Action issued on Mar. 18, 2024 for U.S. Appl. No. 17/897,722.
(Continued)

*Primary Examiner* — Liliana Cerullo
(74) *Attorney, Agent, or Firm* — Li & Cai Intellectual Property (USA) Office

(57) ABSTRACT

A lighting touchpad is provided. The lighting touchpad includes a substrate, a plurality of first electrodes, a plurality of second electrodes, a plurality of bonding pads and a plurality of lighting devices. The plurality of first electrodes, the plurality of second electrodes and the plurality of bonding pads are arranged on the substrate, and the first electrodes, the second electrodes, and the bonding pads are alternately arranged in a sensing area without overlapping with one another. The pluralities of lighting devices are connected to a part of the bonding pads. The sensing area includes a plurality of sensing cells, and the first electrodes, the second electrodes and the bonding pads are arranged according to a predetermined spatial characteristic for each of the sensing cells

8 Claims, 13 Drawing Sheets

Related U.S. Application Data a continuation-in-part of application No. 18/140,890, filed on Apr. 28, 2023, now Pat. No. 12,093,480, said application No. 17/897,722 is a continuation-in-part of application No. 17/401,858, filed on Aug. 13, 2021, now Pat. No. 11,687,187, said application No. 18/140,890 is a division of application No. 17/401,858, filed on Aug. 13, 2021, now Pat. No. 11,687,187.

(56) References Cited

U.S. PATENT DOCUMENTS

| | | |
|---|---|---|
| 2010/0044122 A1 | 2/2010 | Sleeman et al. |
| 2010/0163317 A1 | 7/2010 | Tai |
| 2017/0068362 A1* | 3/2017 | Den Boer ................. G09G 3/32 |
| 2017/0269749 A1* | 9/2017 | Bok ..................... G02F 1/13338 |
| 2018/0059858 A1 | 3/2018 | Tsai |
| 2019/0369794 A1 | 12/2019 | Lo |
| 2021/0109617 A1 | 4/2021 | Lin et al. |
| 2021/0175282 A1 | 6/2021 | Ikeda et al. |
| 2023/0259228 A1 | 8/2023 | Liao et al. |
| 2023/0307425 A1* | 9/2023 | Wang ................. H01L 25/0753 |

OTHER PUBLICATIONS

USPTO, Office Action issued on Dec. 27, 2023 for U.S. Appl. No. 18/140,890.

USPTO, Office Action issued on Apr. 4, 2025 for U.S. Appl. No. 18/789,632.

USPTO, US Office Action issued on Jul. 21, 2025 for U.S. Appl. No. 18/939,607.

\* cited by examiner

LIGHTING TOUCHPAD WITH SENSING ELECTRODE LAYOUT WITH LIGHTING DEVICES EVENLY DISTRIBUTED

CROSS-REFERENCE TO RELATED PATENT APPLICATION

This application is a continuation-in-part application of the U.S. patent application Ser. No. 18/140,890, filed on Apr. 28, 2023, and entitled "LIGHTING TOUCHPAD," now pending, the entire disclosures of which are incorporated herein by reference.

This application is a continuation-in-part application of the U.S. patent application Ser. No. 17/897,722, filed on Aug. 29, 2022, and entitled "CAPACITIVE TOUCHPAD," now pending, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a touchpad, and more particularly to a lighting touchpad.

BACKGROUND OF THE DISCLOSURE

In the related art, capacitive touchpads have been adapted for various applications that incorporate lighting effects. One such application is the laptop touchpad. To create appealing illumination, a significant number of light-emitting devices are integrated within the touch sensor units.

For instance, light emitting diodes (LEDs) can be affixed to a printed circuit board (PCB) that contains sensing electrodes. However, when it comes to capacitive sensing circuits, designing a circuit layout that balances light efficiency and ensures uniform performance across all sensor units has emerged as a significant challenge in the field.

SUMMARY OF THE DISCLOSURE

In response to the above-referenced technical inadequacies, the present disclosure provides a lighting touchpad that enhances the uniformity of the sensor cell layout.

In order to solve the above-mentioned problems, one of the technical aspects adopted by the present disclosure is to provide a lighting touchpad, which includes a substrate, a plurality of first electrodes, a plurality of second electrodes, a plurality of bonding pads and a plurality of lighting devices. The plurality of first electrodes, the plurality of second electrodes and the plurality of bonding pads are arranged on the substrate, and the first electrodes, the second electrodes, and the bonding pads are alternately arranged in a sensing area without overlapping with one another. The plurality of lighting devices are connected to a part of the bonding pads. The sensing area includes a plurality of sensing cells, and the first electrodes, the second electrodes and the bonding pads are arranged according to a predetermined spatial characteristic for each of the sensing cells.

In order to solve the above-mentioned problems, another one of the technical aspects adopted by the present disclosure is to provide a lighting touchpad that includes a substrate, a plurality of first electrodes, a plurality of second electrodes, and a plurality of bonding pads. The plurality of first electrodes, the plurality of second electrodes, and the plurality of bonding pads are arranged on the substrate. At least one of the first electrodes neighbored by N of the second electrodes along N gaps, and N openings are existed in the N gaps, respectively. The plurality of bonding pads are located in the plurality of openings, respectively.

In order to solve the above-mentioned problems, another one of the technical aspects adopted by the present disclosure is to provide a lighting touchpad that includes a substrate, a plurality of first electrodes, a plurality of second electrodes, and a plurality of bonding pads. The plurality of first electrodes, the plurality of second electrodes, and the plurality of bonding pads are arranged on the substrate. Each of the first electrodes includes a first opening, and each of the second electrodes includes a second opening. The plurality of bonding pads are located in the first opening of each of the first electrodes and the second opening of each of the second electrodes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
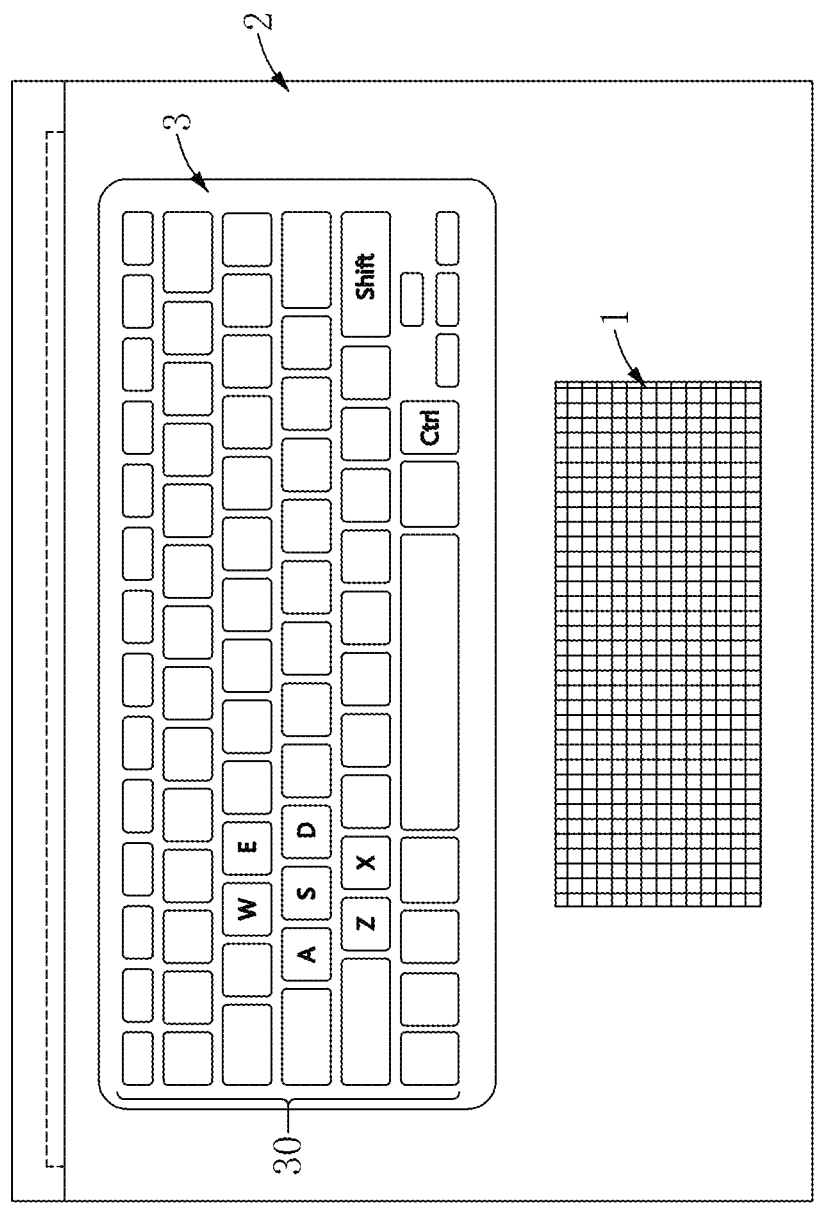
FIG. 1 is a schematic view of a lighting touchpad applied to a laptop according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a lighting touchpad 1. The lighting touchpad 1 can be provided for an electronic device, such as a laptop 2. For example, the light touchpad 1 can be typically located in the center of the laptop 2, below the keyboard 3, as shown in FIG. 1. In some embodiments, the lighting touchpad 1 can be positioned to be centered with letter keys 30 of the keyboard 3 rather than the whole chassis of the laptop 2, so as to prevent user's wrist from accidentally touching the lighting touchpad 1 while typing.

Figure 2:
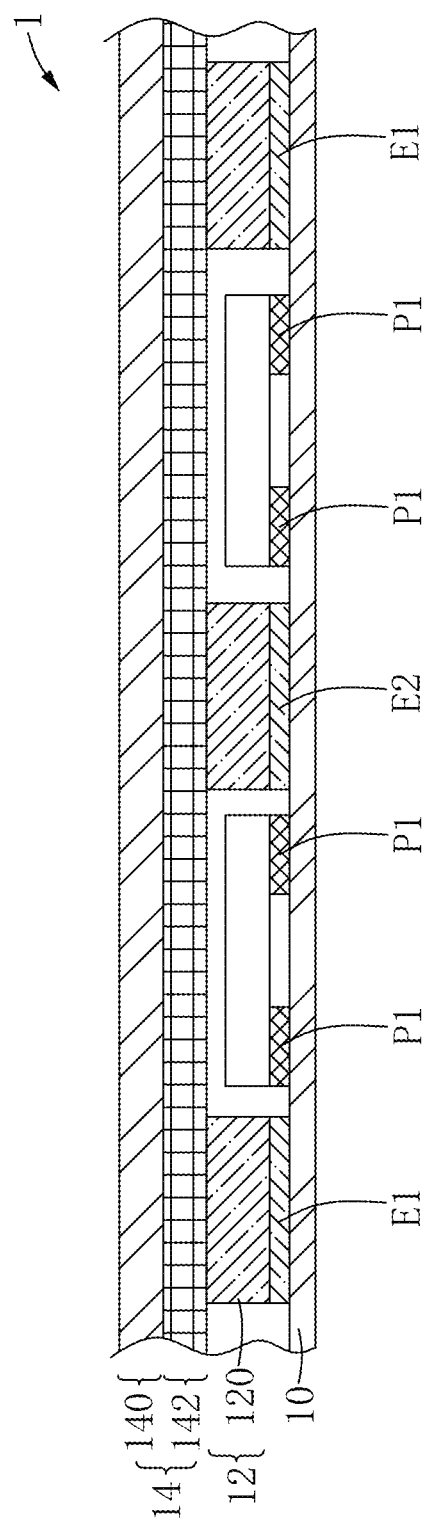
FIG. 2 is a schematic side view of the lighting touchpad according to the first embodiment of the present disclosure.

The lighting touchpad 1 of the present disclosure can be a capacitive touchpad with integrated light-emitting elements. Referring to FIG. 2, the lighting touchpad 1, also referred to as a trackpad, has a flat surface that detects a motion and a position of a user's finger, and translates the detected motion and position to a position on a display of the laptop 2, so as to control a pointer in a graphical user interface (GUI). In addition, the lighting touchpad 1 can provide lighting effects according to the user's needs or in response to operations of the laptop 2.

As shown in FIG. 2, the lighting touchpad 1 can include a substrate 10, a plurality of first electrodes E1, a plurality of second electrodes E2, a plurality of bonding pads P1 and a plurality of lighting devices L1. The substrate 10 is a base layer of the touchpad 1, which can be a printed circuit board, and the first electrodes E1, the second electrodes E2 and the bonding pads P1 are spaced from one another. Specifically, the bonding pads P1 can be disposed between one of the first electrodes E1 and one of the second electrodes E2, and the lighting device L1 can be similarly disposed between one of the first electrodes E1 and one of the second electrodes E2, so as to be placed onto and connected to the bonding pads P1. Each of the lighting devices L1 can be, for example, a light-emitting diode (LED), but the present disclosure is not limited thereto.

Moreover, the lighting touchpad 1 can includes a supporting layer 12 and a protection layer 14. The supporting layer 12 can include multiple supporting components 120 that are positioned on the first electrodes E1 and the second electrodes E2. The protection layer 14 can be placed over the supporting layer 12, and the protection layer 14 can include a transparent substrate 140 and an optical film 142 layered together. It should be noted that the supporting components 120 can serve to support the protection layer 14 to create spaces for housing the lighting devices L1, thereby preventing any direct contact between the lighting devices L1 and the protection layer 14.

Furthermore, the first electrodes E1 and the second electrodes E2 of the lighting touchpad 1 are used to form a plurality of capacitive sensors. For example, the first electrodes E1 serve as transmitting electrodes, the second electrodes E2 serve as receiving electrodes, and the first electrodes E1 and the second electrodes E2 work together to detect touch inputs. Specifically, a specific waveform voltage can be applied by the transmitting electrode, usually a square wave pulse, from a controller (e.g., an integrated circuit) to the lighting touchpad 1, and the receiving electrodes can measure the voltage response through a measurement circuit inside the controller.

The operation of the first electrodes E1 and the second electrodes E2 is based on the principle of capacitive sensing. Capacitive touch sensing works on the principle that, as a human finger approaches copper-etched touch sensor electrodes (i.e., the first electrodes E1 and the second electrodes E2) on a top side of the substrate 10 (e.g., PCB), the capacitance of the electrode changes. This change in capacitance is sensed by either a general-purpose microcontroller input or a dedicated touch control device input, connected to the sensor electrode.

In the present embodiment, the first electrodes E1 and the second electrodes E2 can be configured by the controller to perform two different types of capacitive sensing mechanisms, including self-capacitance sensing and mutual-capacitance sensing, and the present disclosure is not limited thereto.

In addition, the optical film 142 in the protection layer 14 can be an optical element for protection, brightness enhancement and uniformity by reflecting and diffusing the light from the corresponding lighting device L1 to create a uniform illumination across the lighting touchpad 1. The optical film 142 may have different properties depending on the application and the desired light effects of the lighting touchpad.

For example, the optical film can include one or more polarizing films that can filter out unwanted light waves and enhance the contrast and color of the display. The optical film can also include one or more brightness enhancement films that can increase the luminosity of the lighting device L1 by redirecting the light rays to a narrower angle. The optical film can include one or more diffuser films that can scatter the light rays to create a softer and more even illumination.

Figure 3:
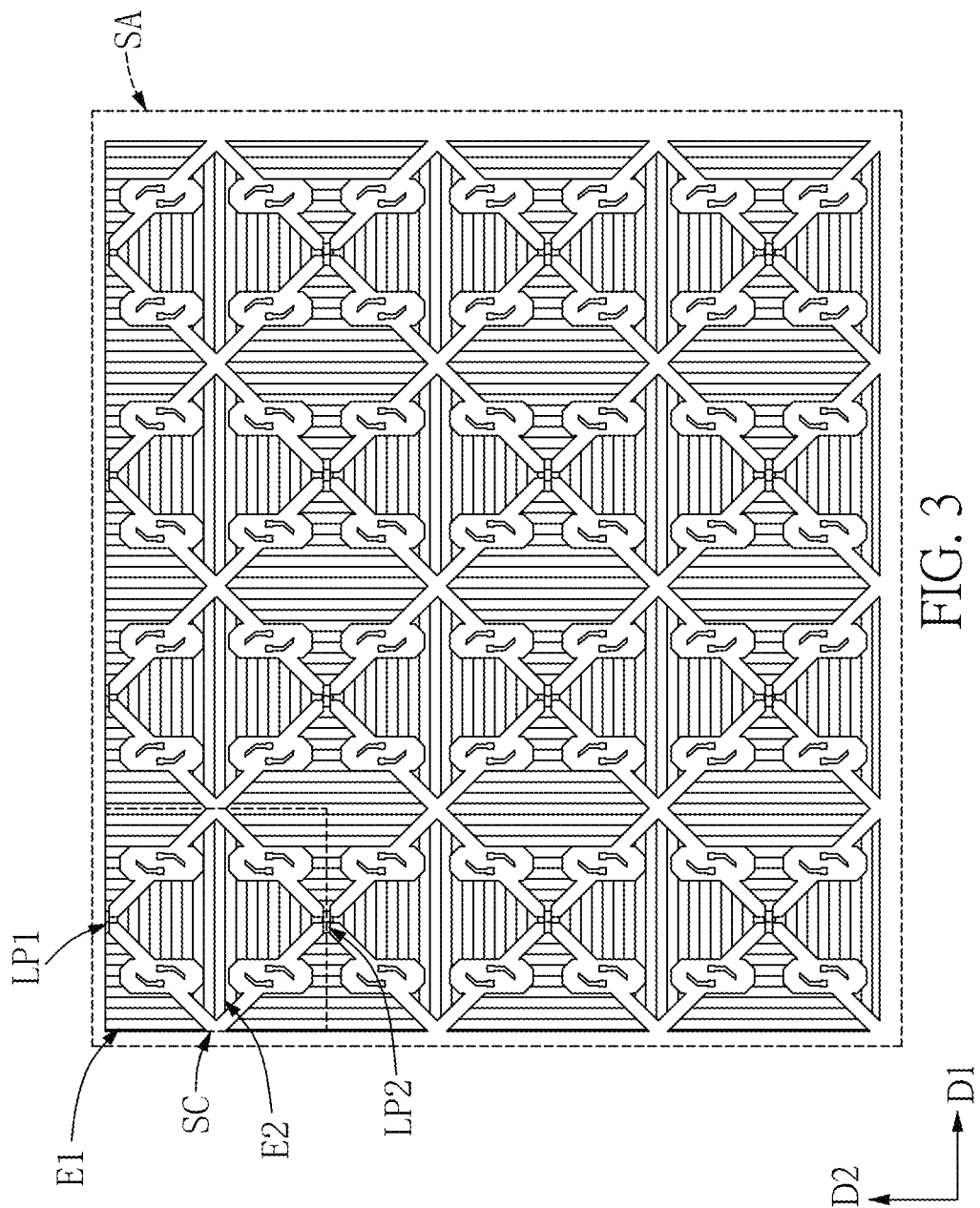
FIG. 3 is a top view of a sensing area of the lighting touchpad according to the first embodiment of the present disclosure.

As shown in FIG. 3, the plurality of first electrodes E1, the plurality of second electrodes E2 and the plurality of bonding pads P1 are arranged on a top side of the substrate 10, and the first electrodes E1, the second electrodes E2, and the bonding pads P1 are alternately arranged in a sensing area SA of the lighting touchpad 1 without overlapping with one another.

More specifically, the sensing area SA includes a plurality of sensing cells SC, and the first electrodes E1, the second electrodes E2 and the bonding pads P1 are arranged according to a predetermined spatial characteristic for each of the sensing cells.

Referring to FIG. 3, the first electrodes E1 are arranged along a first direction D1, the second electrodes E2 are arranged along a second direction D2 that is substantially perpendicular to the first direction D1, and the first electrodes E1 and the second electrodes E2 can have identical shapes, such as diamond-like shapes. Each of the first electrodes E1 can be provided with one or more first opening OP1 for accommodating some of the bonding pads P1. In the present embodiment, the first electrode E1 has four first opening OP1 located on four edges of the diamond-like shape.

Similarly, each of the second electrodes E2 has at least one second opening OP2 for accommodating one or more of the bonding pads P1. In the present embodiment, the second electrode E2 has four second opening OP2 located on four edges of the diamond-like shape. Furthermore, each of the first opening OP1 is arranged to face adjacent one of the second opening OP2, and the bonding pads P1 in each of the first opening OP1 and the corresponding second opening OP2 can be arranged along the first direction D1. In other embodiments, the bonding pads P1 in each of the first opening OP1 and the corresponding second opening OP2 can be arranged along the second direction D2.

Figure 4:
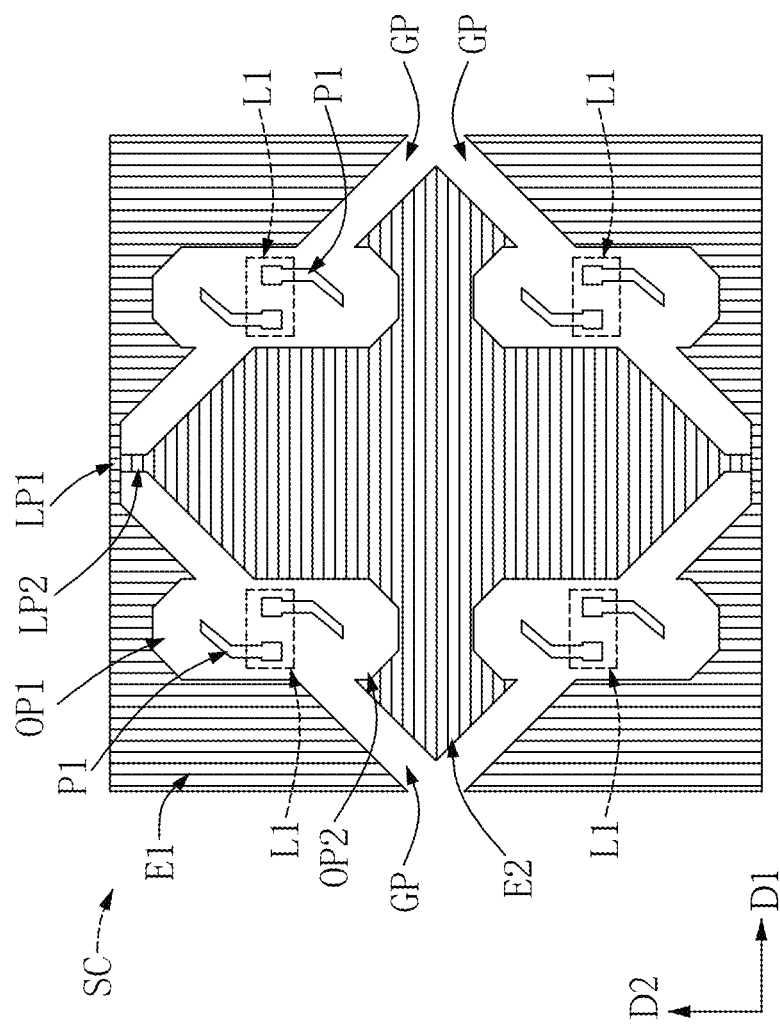
FIG. 4 is a top view of one of the sensing cells according to the first embodiment of the present disclosure.

Referring to FIG. 4, which is a top view of one of the sensing cells according to the first embodiment of the present disclosure. The sensing cell SC of FIG. 4 has a rectangular shape captured from the sensing area SA of FIG. 3. The sensing cell SC can include one complete second electrode E2 with a diamond-like shape and four incomplete first electrodes E1 each having a triangular shape, the complete second electrode E2 is located at the center of the sensing cell SC, and the four incomplete first electrodes E1 are located at four corners of the sensing cell SC. In addition, in each of the sensing cells SC, the bonding pads P1 can be arranged to be adjacent to four corners of the rectangular shape.

Figure 5:
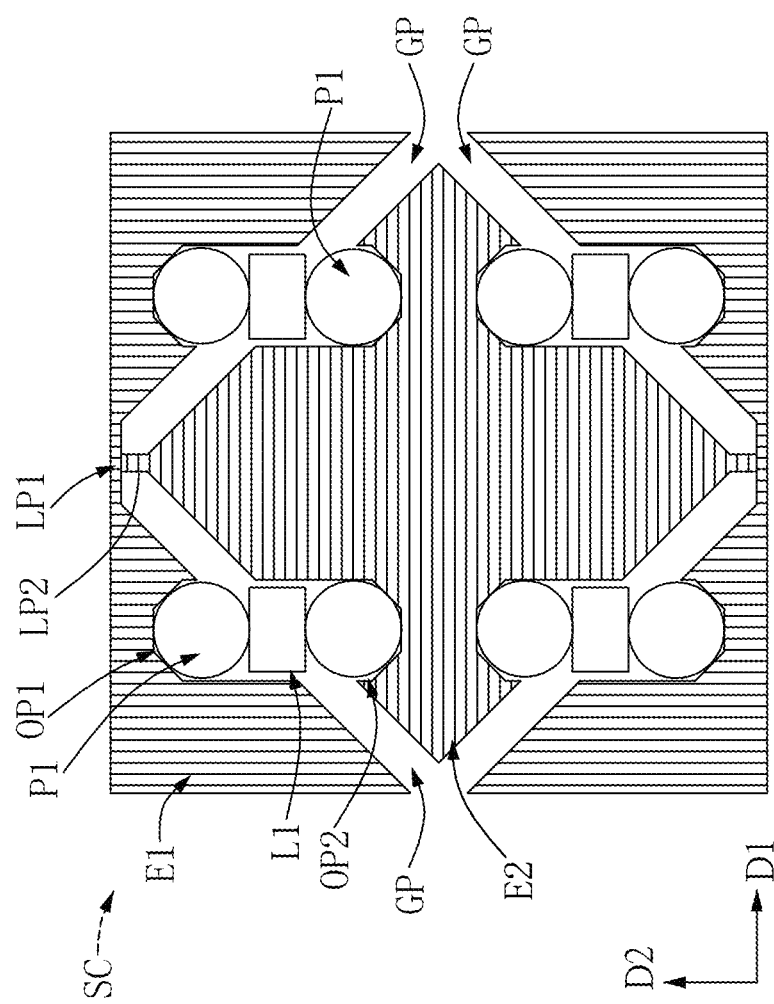
FIG. 5 is a top view of another configuration of the sensing cell according to the first embodiment of the present disclosure.

In the present embodiment, one of the first opening OP1 and the corresponding second opening OP2 can jointly form a capsule shaped opening that extends along the second direction D2 and surrounds two of the bonding pads P1, and the bonding pads P1 are each formed in a tadpole shape, but the present disclosure is not limited thereto. As shown in FIGS. 4 and 5, the lighting devices L1 are arranged without overlapping with the first electrodes E1 and the second electrodes E2, and each of the lighting devices L1 can be located between one of the first electrodes E1 and one of the second electrodes E2.

Moreover, at least one of the first electrodes E1 can be neighbored by N (e.g., 4) of the second electrodes E2 along N (e.g., 4) gaps GP, and N (e.g., 4) openings (e.g., OP1 and/or OP2) are existed in the N (e.g., 4) gaps GP, respectively. The bonding pads P1 can be located in the openings (e.g., OP1 and/or OP2), respectively. N can be an integer that is equal to or larger than one. More specifically, each of the lighting devices L1 can be disposed in the capsule shaped opening formed by the first opening OP1 and the second opening OP2, and is connected to the two bonding pads P1. The lighting device L1 can be electrically connected to heads of the tadpole shapes of the bonding pads P1 by soldering process. However, the present disclosure does not limit the shapes of the bonding pads P1.

Although each of the sensing cells SC is provided with four of the lighting devices L1, the present disclosure is not limited thereto. In other embodiments, a part of the bonding pads P1 can serve as dummy pads that are not connected to any of the lighting devices L1. That is, regardless of whether the lighting device L1 is provided in the sensing cells SC or not, the shape and configuration relationship of the bonding pads, the first electrodes, and the second electrodes remain the same. Such a sensing electrode layout can maintain the uniformity of each sensing cell SC after the lighting devices L1 are set, thereby ensuring basic capacitance and high sensing performance.

Referring to FIG. 5, FIG. 5 is a top view of another configuration of the sensing cell according to the first embodiment of the present disclosure. In FIG. 5, the bonding pads P1 are presented by ball pads that are used to connected the corresponding lighting device L1 to other conductive layer disposed under the conductive layer where the bonding pads P1 are located. The bonding pads P1 are spaced from the first electrodes E1 and the second electrodes E2, so as to be electrically isolated.

Similarly, at least one of the first electrodes E1 can be neighbored by N (e.g., 4) of the second electrodes E2 along N (e.g., 4) gaps GP, and N (e.g., 4) openings (e.g., OP1 and/or OP2) are existed in the N (e.g., 4) gaps GP, respectively. The bonding pads P1 can be located in the openings (e.g., OP1 and/or OP2), respectively, and N can be an integer that is equal to or larger than one.

In the present embodiment, as shown in FIGS. 3 to 5, the lighting touchpad 1 further includes a plurality of first linking patterns LP1 and a plurality of second linking patterns LP2. Each of the first linking pattern LP1 extends along the first direction D1 and used to couple adjacent ones of the first electrodes E1 to each other. Each of the second linking patterns LP2 extends along the second direction D2 and used to couple adjacent two of the second electrodes E2 to each other, such that the sensing area SA is provided with a sensor matrix. In the present embodiment, each of the first linking patterns LP1 can overlap with a corresponding one of the second linking patterns LP2 along a normal direction of the substrate 10. In some embodiments, the first linking patterns LP1 and/or the second linking patterns LP2 can be disposed under the substrate 10 by designing one or more through-holes that penetrating through the substrate 10, such that the first linking pattern LP1 can serve as a bridge pattern for adjacent two of the first electrodes E1, and/or the second linking pattern LP2 can serve as a bridge pattern for adjacent two of the second electrodes E2.

Therefore, in the lighting touchpad 1 provided in the first embodiment, the uniformity of the sensor cells SC can be enhanced. That is, in each of the sensing cells SC, the lighting devices L1 are evenly distributed, and the first electrodes E1 and the second electrodes E2 are arranged identically. In this way, high consistency of the sensor configuration can achieve uniform base capacitance values for the sensing cells, leading to improved touch sensing performance, such as linearity and jitter, and there is no need to sacrifice the consistency of the sensing cells to achieve a specific lighting effect.

By setting the dummy pads, the shape and configuration relationship of the bonding pads, first electrodes, and second electrodes remain the same. Such a sensing electrode layout can maintain the uniformity, thereby ensuring basic capacitance and high sensing performance. Furthermore, the dummy pads also assist in preserving the residual metal ratio (also known as the metal spreading rate), so as to avoid warpage issues due to varying residual metal ratio.

Second Embodiment

Figure 6:
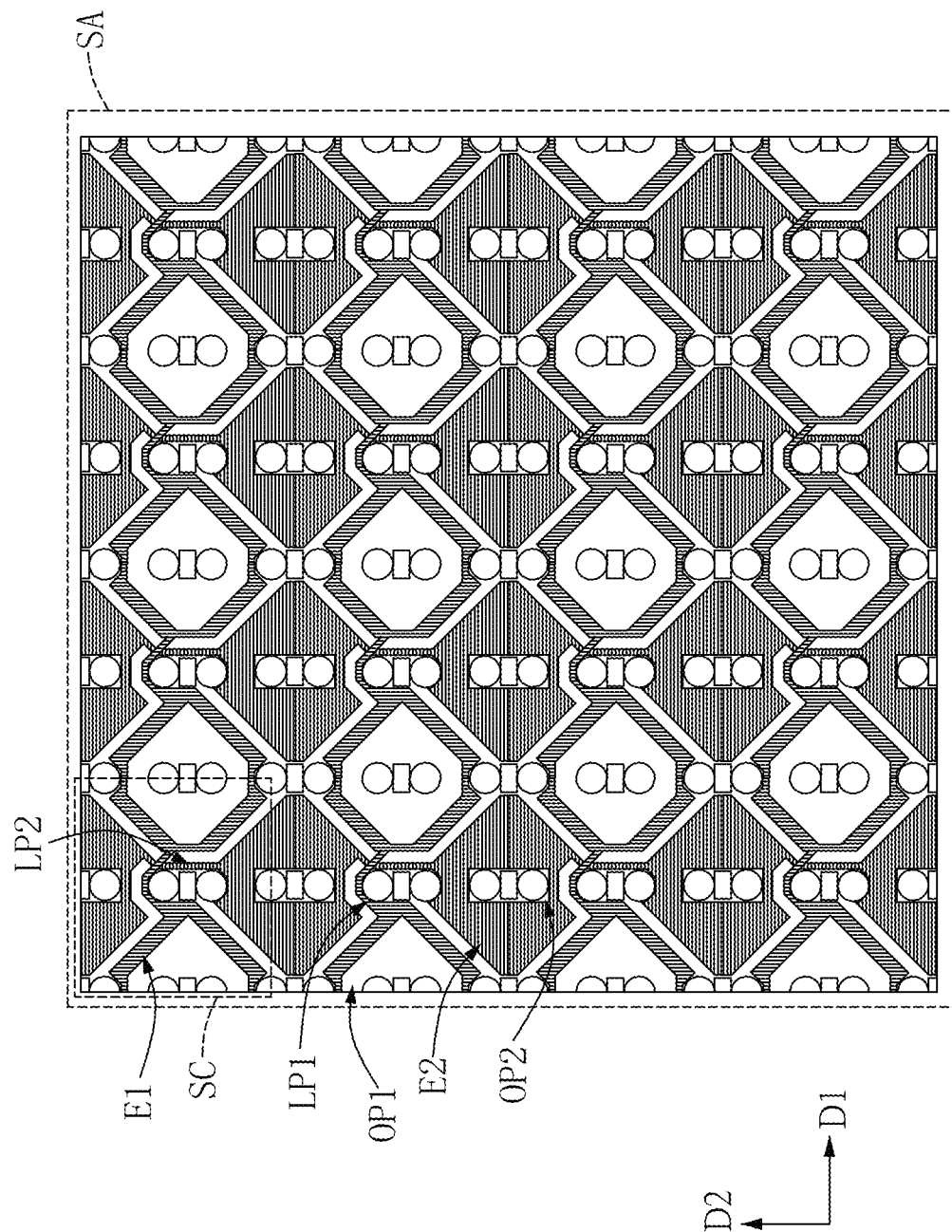
FIG. 6 is a top view of a sensing area of the lighting touchpad according to a second embodiment of the present disclosure.
Figure 7:
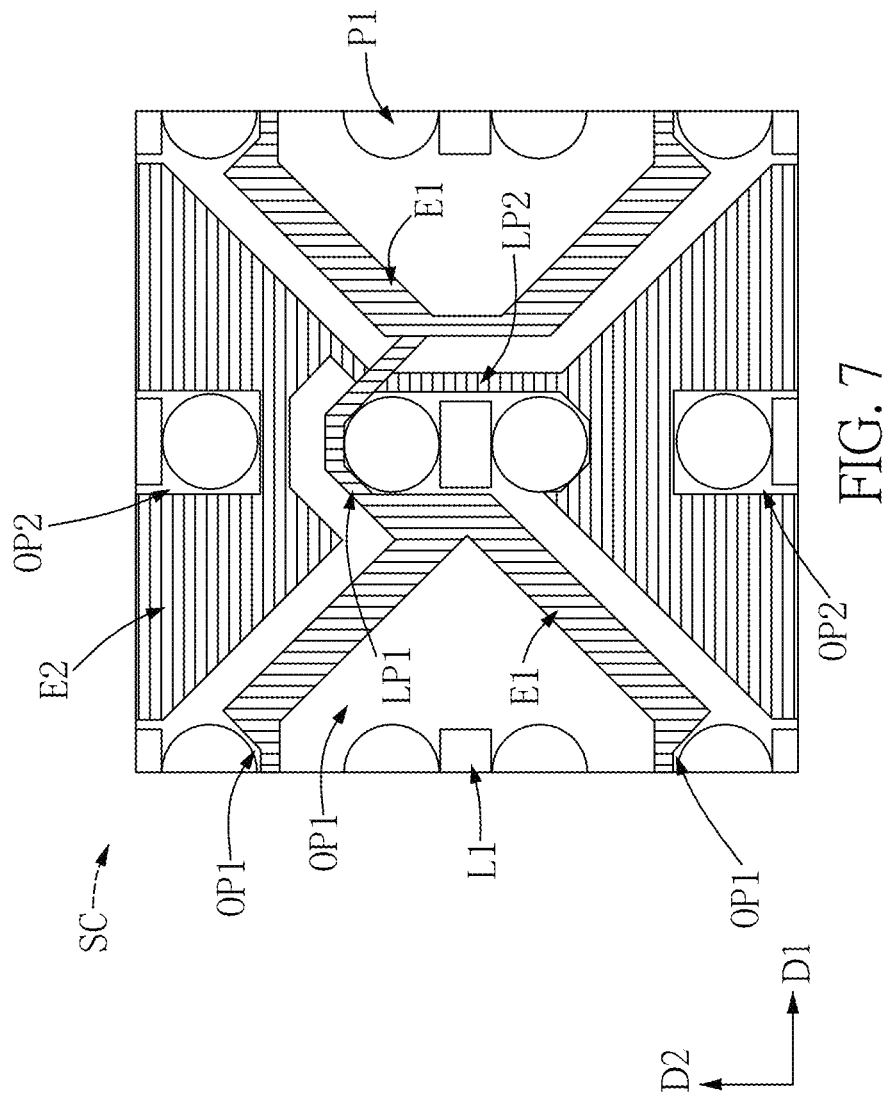
FIG. 7 is a top view of one of the sensing cells according to the second embodiment of the present disclosure.

Referring to FIGS. 6 and 7, a second embodiment of the present disclosure is similar to the first embodiment of the present disclosure. For the sake of brevity, descriptions of the same components in the first and second embodiments of the present disclosure will be omitted herein, and the following description only discloses different features between the first and second embodiments.

As shown in FIG. 6, the plurality of first electrodes E1, the plurality of second electrodes E2 and the plurality of bonding pads P1 are alternately arranged in a sensing area SA of the lighting touchpad 1 without overlapping with one another.

Similarly, the sensing area SA includes a plurality of sensing cells SC, and the first electrodes E1, the second electrodes E2 and the bonding pads P1 are arranged according to a predetermined spatial characteristic for each of the sensing cells SC.

Referring to FIG. 6, the first electrodes E1 are arranged along a first direction D1, the second electrodes E2 are arranged along a second direction D2 that is substantially perpendicular to the first direction D1. The first electrodes E1 and the second electrodes E2 have similar shapes, such as hollow diamond-like shapes.

Referring to FIG. 7, each of the first electrodes E1 can be provided with one or more first opening OP1 for accommodating certain of the bonding pads P1. In the present embodiment, the first electrode E1 has three first opening OP1, one of which is located at the center of the hollow diamond-like shape, and two of which are located at two corners of the hollow diamond-like shape.

Similarly, each of the second electrodes E2 can be provided with one or more second openings OP2 for accommodating one or more of the bonding pads P1. In the present embodiment, the second electrode E2 has three second opening OP2, one of which is located at the center of the second electrode E2, and two of which are located at two corners of the hollow diamond-like shape. Specifically, the first opening OP1 at the center of the first electrode E1 has a hexagon, the second opening OP2 at the center of the second electrode E2 has a rectangular shape, and an area of the first opening OP1 at the center is larger than an area of the second opening at the center.

Furthermore, the bonding pads P1 in each of the first opening OP1 and the corresponding second opening OP2 can be arranged along the first direction D1. In other embodiments, the bonding pads P1 in each of the first opening OP1 and the corresponding second opening OP2 can be arranged along the second direction D2.

Referring to FIG. 7, which is a top view of one of the sensing cells according to the second embodiment of the present disclosure. The sensing cell SC of FIG. 7 has a rectangular shape captured from the sensing area SA of FIG. 6. The sensing cell SC can include two incomplete second electrode E2 each with a hollow triangle and two incomplete first electrodes E1 each with a hollow triangle shape, the two incomplete second electrodes E2 are located at two sides of the sensing cell SC, and the two incomplete first electrodes E1 are located at other two sides of the sensing cell SC. In addition, in each of the sensing cells SC, the bonding pads P1 can be arranged to be adjacent to four corners, four edges and at the center of the rectangular shape.

In the present embodiment, as shown in FIGS. 6 and 7, the lighting touchpad 1 further includes a plurality of first linking patterns LP1 and a plurality of second linking patterns LP2. Each of the first linking pattern LP1 formed of a C-shaped metal element and is used to couple adjacent two of the first electrodes E1 to each other along the first direction D1, and an opening of the C-shape faces toward a direction opposite to the second direction D2. Each of the second linking pattern LP2 extends along the second direction D2 and used to couple adjacent two of the second electrodes E2 to each other, such that the sensing area SA is provided with a sensor matrix.

In the present embodiment, each of the first linking patterns LP1 can overlap with a corresponding one of the second linking patterns LP2 along a normal direction of the substrate 10. In some embodiments, the first linking patterns LP1 and/or the second linking patterns LP2 can be disposed under the substrate 10 by arranging one or more through-holes that penetrating through the substrate 10, such that the first linking pattern LP1 can serve as a bridge pattern for adjacent two of the first electrodes E1, and/or the second linking pattern can serve as a bridge pattern for adjacent two of the second electrodes E2.

Moreover, two of the second openings OP2 at the corners of two of the second electrodes E2, one of the first linking patterns LP1 and one of the second linking patterns LP2 can jointly form a capsule shaped opening that extends along the second direction D2 and surrounds two of the bonding pads P1, and the bonding pads P1 are each formed as a ball pad, but the present disclosure is not limited thereto, and the present disclosure does not limit the shapes of the bonding pads P1.

As shown in FIGS. 6 and 7, the lighting devices L1 are arranged without overlapping with the first electrodes E1 and the second electrodes E2 at a top side of the substrate 10, however, the lighting devices L1 may overlap with the first electrodes E1 and the second electrodes E2 (e.g., bridge pattern) at a bottom side of the substrate 10, but the present disclosure is not limited thereto.

a first part of the lighting devices L1 can each be located between two of the first electrodes E1 and between two of the second electrodes E2, a second part of the lighting devices L1 can be surrounded by the first electrodes E1, respectively, and a third part of the lighting device L1 can be surrounded by the second electrodes E2, respectively.

More specifically, each of the first part of the lighting devices L1 can be disposed in the capsule shaped opening formed by two of the second openings OP2 at the corners of two of the second electrodes E2, one of the first linking patterns LP1 and one of the second linking patterns LP2, and is connected to the two bonding pads P1.

In this embodiment, each of the sensing cells SC is provided with three of the lighting devices L1 (an equivalent quantity is three), but the present disclosure is not limited thereto. In other embodiments, a part of the bonding pads P1 can serve as dummy pads that are not connected to any of the lighting devices L1. That is, regardless of whether the lighting device L1 is provided in the sensing cells SC or not, the shape and configuration relationship of the bonding pads, first electrodes, and second electrodes remain the same. Such a sensing electrode layout can maintain the uniformity of each sensing cell SC after the lighting devices L1 are set, thereby ensuring basic capacitance and high sensing performance.

Therefore, in the lighting touchpad 1 provided in the second embodiment, the uniformity of the sensor cells SC can be enhanced. That is, in each of the sensing cells SC, the lighting devices L1 can be evenly distributed, and the first electrodes E1 and the second electrodes E2 are arranged identically. In this way, high consistency of the sensor configuration can achieve uniform base capacitance values for the sensing cells, leading to improved touch sensing performance, such as linearity and jitter, and there is no need to sacrifice the consistency of the sensing cells to achieve a specific lighting effect.

By setting the dummy pads, the shape and configuration relationship of the bonding pads, first electrodes, and second electrodes remain the same. Such a sensing electrode layout can maintain the uniformity, thereby ensuring basic capacitance and high sensing performance. Furthermore, the dummy pads also assist in preserving the residual metal ratio (also known as the metal spreading rate), so as to avoid warpage issues due to varying residual metal ratio.

Third Embodiment

Figure 8:
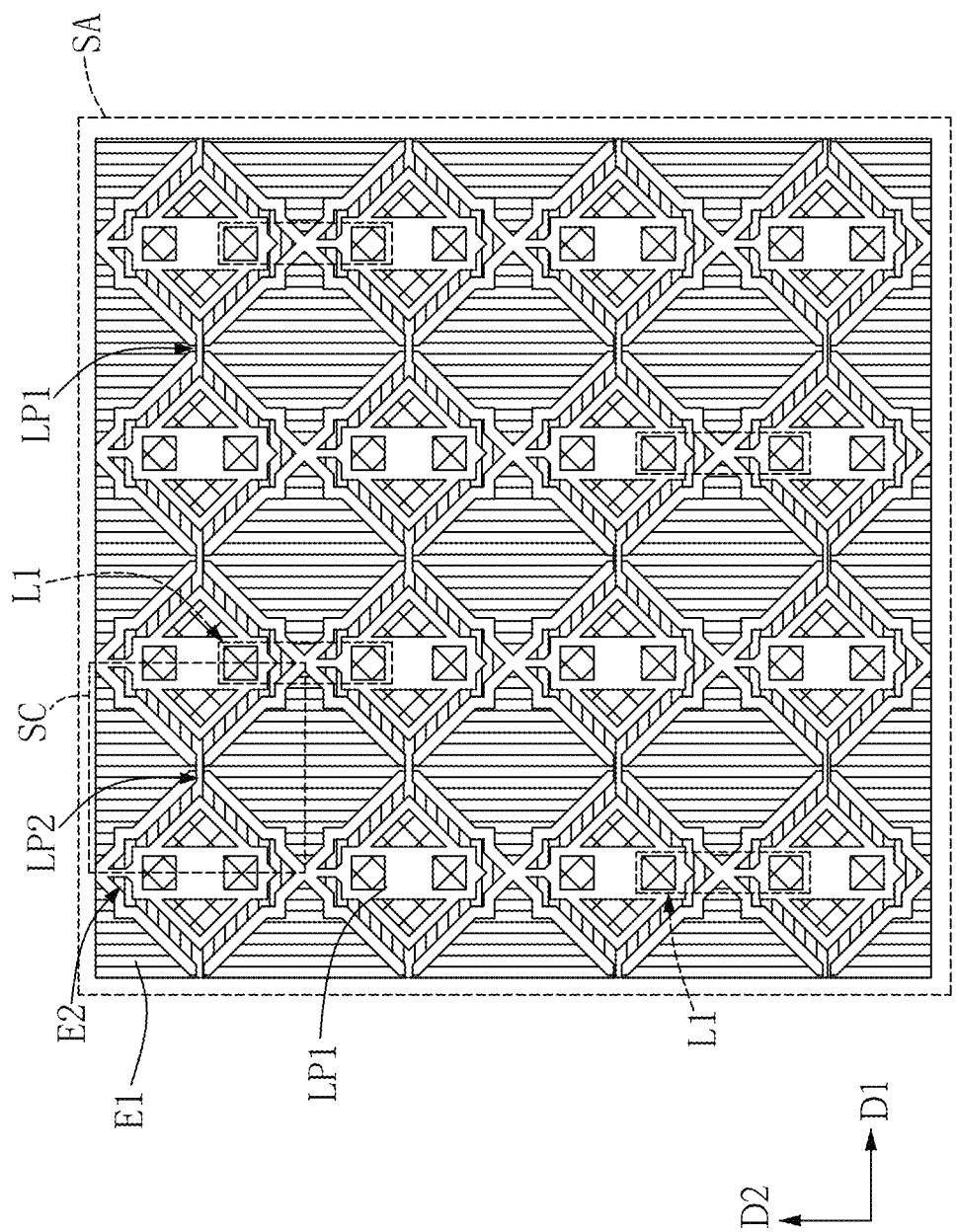
FIG. 8 is a top view of a sensing area of the lighting touchpad according to a third embodiment of the present disclosure.
Figure 9:
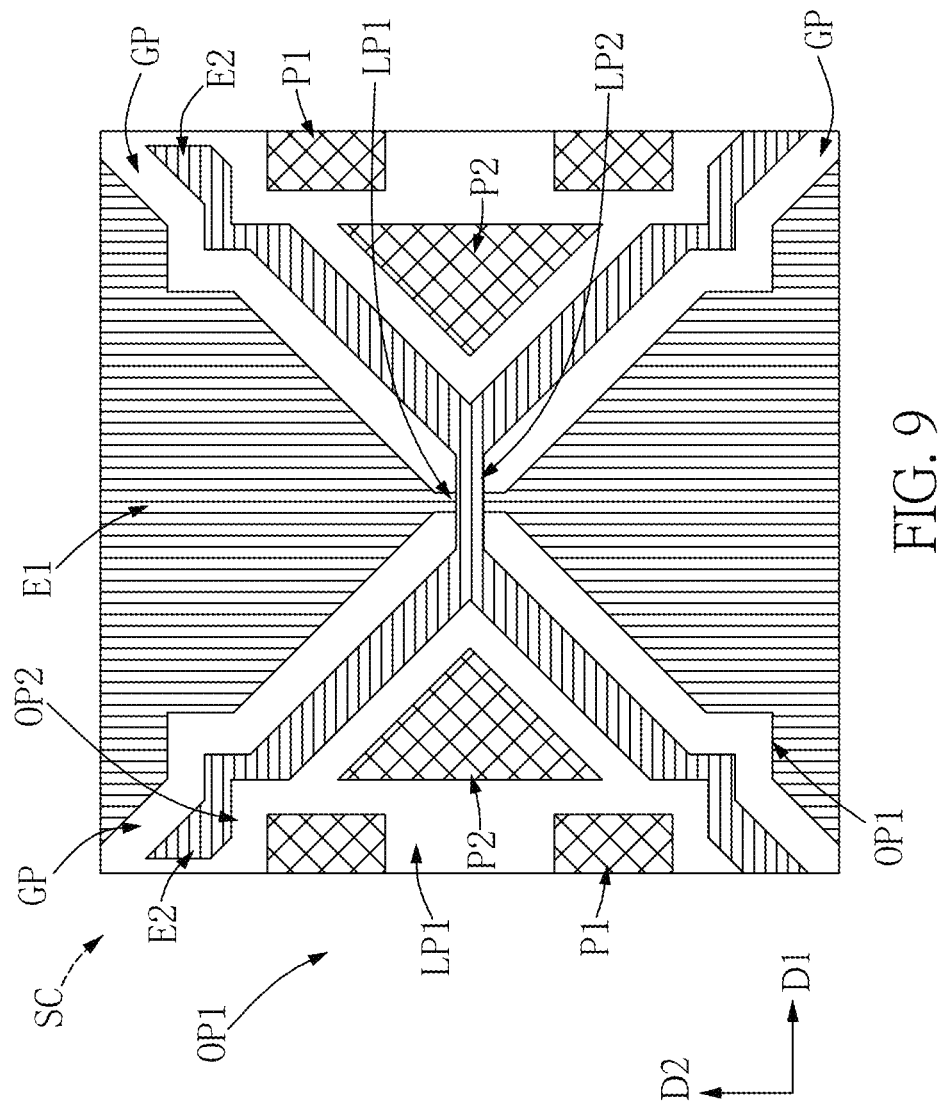
FIG. 9 is a top view of one of the sensing cells according to the third embodiment of the present disclosure.

Referring to FIGS. 8 and 9, a third embodiment of the present disclosure is similar to the first and second embodiments of the present disclosure. For the sake of brevity, descriptions of the same components in the first, second and third embodiments of the present disclosure will be omitted herein, and the following description only discloses different features between the first and second embodiments.

As shown in FIG. 8, a plurality of first electrodes E1, a plurality of second electrodes E2, a plurality of bonding pads P1 and a plurality of second dummy pads P2 are alternately arranged in a sensing area SA of the lighting touchpad 1 without overlapping with one another.

Similarly, the sensing area SA includes a plurality of sensing cells SC, and the first electrodes E1, the second electrodes E2, the bonding pads P1 and the second dummy pads P2 are arranged according to a predetermined spatial characteristic for each of the sensing cells SC.

Referring to FIG. 8, the first electrodes E1 are arranged and connected in series along a second direction D2, the second electrodes E2 are arranged and connected in series along a first direction D1 that is substantially perpendicular to the second direction D2. The first electrodes E1 and the second electrodes E2 have different shapes, for example, the first electrodes E1 have diamond-like shapes, and the second electrodes E2 have hollow diamond-like shapes.

Referring to FIG. 9, each of the first electrodes E1 can be provided with one or more first opening OP1 for accommodating certain of the bonding pads P1. In the present embodiment, the first electrode E1 has four first opening OP1 that are located at four edges of the diamond-like shape. In addition, four of the first openings OP1 of different four of the first electrodes E1 are used to accommodate a part of one of the second electrodes E1, two of the bonding pads P1 and two of the second dummy pads P2.

Each of the second electrodes E2 can be provided with one or more second openings OP2 for accommodating one or more of the bonding pads P1. In the present embodiment, the second electrode E2 has five second opening OP2, four of which are located at four edges of the hollow diamond-like shape, respectively, and one of which is located a corner of the hollow diamond-like shape, so as to form a discontinuous diamond-like frame.

In this embodiment, at least one of the first electrodes E1 can be neighbored by N (e.g., 4) of the second electrodes E2 along N (e.g., 4) gaps GP, and N (e.g., 4) openings (e.g., OP1 and/or OP2) are existed in the N (e.g., 4) gaps GP, respectively. The bonding pads P1 can be located in the openings (e.g., OP1 and/or OP2), respectively, and N can be an integer that is equal to or larger than one.

Furthermore, adjacent two of the bonding pads P1 are surrounded by four of the second openings OP2 and four of the first openings OP1. In other embodiments, and adjacent two of the second dummy pads P2 are surrounded by the four of the second openings OP2 and the four of the first openings OP1. That is, two bonding pads P1 and two second dummy pads P2 disposed at a hollow portion formed at the center of the second electrode E2, the two bonding pads P1 can be arranged along the second direction D2, and the two second dummy pads P2 can be arranged along the first direction D1.

Referring to FIG. 9, which is a top view of one of the sensing cells according to the third embodiment of the present disclosure. The sensing cell SC of FIG. 9 has a rectangular shape captured from the sensing area SA of FIG. 8. The sensing cell SC can include two incomplete second electrode E2 each with a hollow triangle and two incomplete first electrodes E1 each with a solid triangle shape, the two incomplete second electrodes E2 are located at two sides of the sensing cell SC, and the two incomplete first electrodes E1 are located at other two sides of the sensing cell SC. In addition, in each of the sensing cells SC, the bonding pads P1 can be arranged to be adjacent to two edges of the rectangular shape, and the second dummy pads P2 can be arranged between the second electrode E2 and the bonding pads P1. In this embodiment, each of the bonding pads P1 has a rectangular shape, and each of the second dummy pads has a triangular shape.

In the present embodiment, as shown in FIGS. 8 and 9, the lighting touchpad 1 further includes a plurality of first linking patterns LP1 and a plurality of second linking patterns LP2. Each of the first linking pattern LP1 extends along the second direction D2 and used to couple adjacent two of the first electrodes E1 to each other. Each of the second linking pattern LP2 extends along the first direction D1 and used to couple adjacent two of the second electrodes E2 to each other, such that the sensing area SA is provided with a sensor matrix.

As shown in FIG. 8, the lighting devices L1 are arranged at corners of the sensing cell SC while overlapping corner parts of the first electrodes E1 and the second electrodes E2. More specifically, each of the lighting devices L1 can be disposed across adjacent four of the sensing cells SC, and is connected to the two bonding pads P1.

In this embodiment, a part of the bonding pads P1 can serve as first dummy pads that are not connected to any of the lighting devices L1. That is, regardless of whether the lighting device L1 is provided in the sensing cells SC or not, the shape and configuration relationship of the bonding pads, the first dummy pads, the second dummy pads, the first electrodes, and the second electrodes remain the same. Such a sensing electrode layout can maintain the uniformity of each sensing cell SC after the lighting devices L1 are set, thereby ensuring basic capacitance and high sensing performance. Further, since the lighting devices L1 are located at the corners of the sensing cells SC, the impact of the lighting devices L1 on touch performance can be reduced.

Therefore, in the lighting touchpad 1 provided in the third embodiment, the uniformity of the sensor cells SC can be enhanced. That is, in each of the sensing cells SC, the lighting devices L1 can be evenly distributed, and the first electrodes E1 and the second electrodes E2 are arranged identically. In this way, high consistency of the sensor configuration can achieve uniform base capacitance values for the sensing cells, leading to improved touch sensing performance, such as linearity and jitter, and there is no need to sacrifice the consistency of the sensing cells to achieve a specific lighting effect.

By setting the first and second dummy pads, the shape and configuration relationship of the bonding pads, the second dummy pads, the first electrodes, and second electrodes remain the same. Such a sensing electrode layout can maintain the uniformity, thereby ensuring basic capacitance and high sensing performance. Furthermore, the dummy pads also assist in preserving the residual metal ratio (also known as the metal spreading rate), so as to avoid warpage issues due to varying residual metal ratio.

Fourth Embodiment

Figure 10:
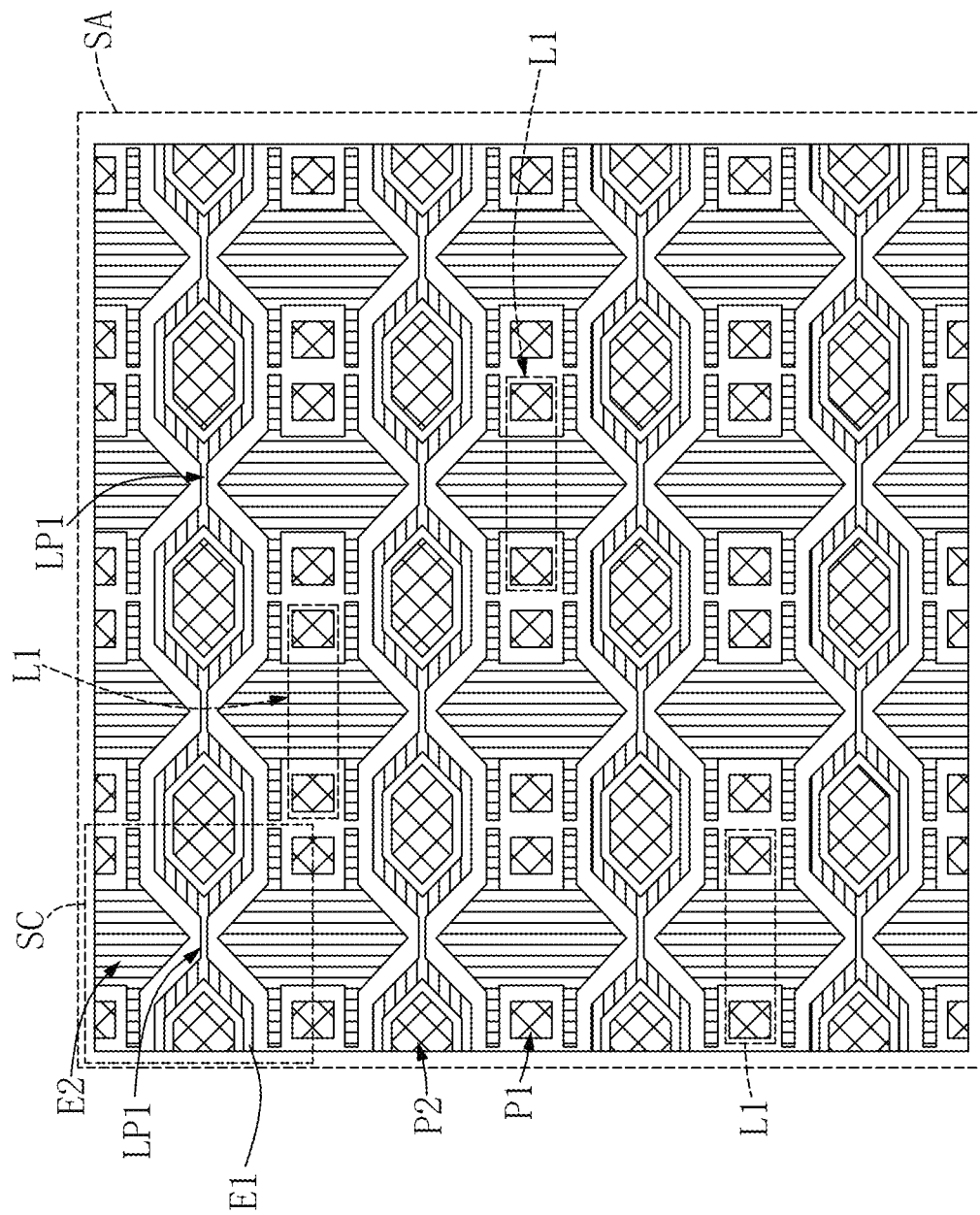
FIG. 10 is a top view of a sensing area of the lighting touchpad according to a fourth embodiment of the present disclosure.
Figure 11:
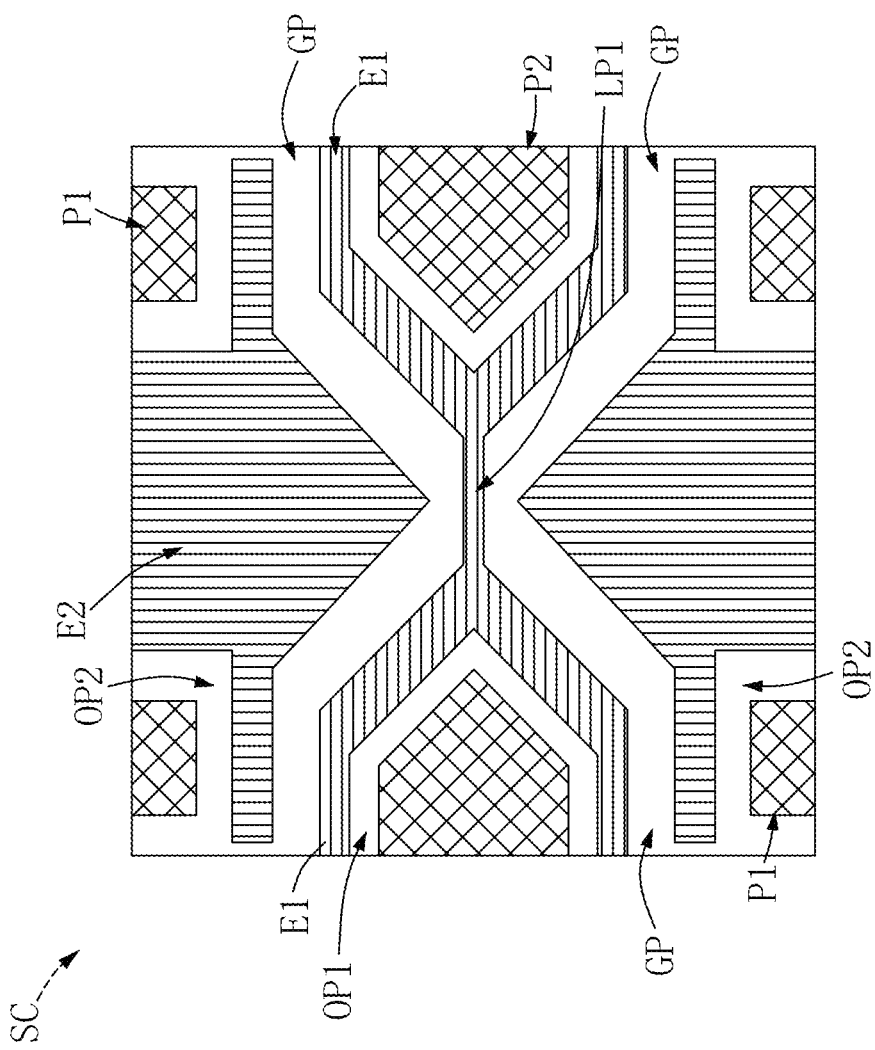
FIG. 11 is a top view of one of the sensing cells according to the fourth embodiment of the present disclosure.

Referring to FIGS. 10 and 11, a fourth embodiment of the present disclosure is similar to the first through third embodiments of the present disclosure. For the sake of brevity, descriptions of the same components in the first, second and third embodiments of the present disclosure will be omitted herein, and the following description only discloses different features between the first and second embodiments.

As shown in FIG. 10, a plurality of first electrodes E1, a plurality of second electrodes E2, a plurality of bonding pads P1 and a plurality of second dummy pads P2 are alternately arranged in a sensing area SA of the lighting touchpad 1 without overlapping with one another.

Similarly, the sensing area SA includes a plurality of sensing cells SC, and the first electrodes E1, the second electrodes E2, the bonding pads P1 and the second dummy pads P2 are arranged according to a predetermined spatial characteristic for each of the sensing cells SC.

Referring to FIG. 10, the first electrodes E1 are arranged and connected in series along a first direction D1, the second electrodes E2 are arranged and connected in series (e.g., through vias and bridges beneath) along a second direction D2 that is substantially perpendicular to the first direction D1. The first electrodes E1 and the second electrodes E2 have different shapes, for example, the first electrodes E1 have hollow hexagonal shapes, and the second electrodes E2 have hexagonal shapes each with multiple branches extending outward.

Referring to FIG. 10, each of the first electrodes E1 can be provided with one first opening OP1 for accommodating one of the second dummy pads P2. In the present embodiment, each of the first electrodes E1 has one first opening OP1 that are located at the center of the hollow hexagonal shape, and the first opening OP1 and the second dummy pads P2 have similar hexagonal shapes.

Each of the second electrodes E2 can be provided with two second openings OP2 for accommodating two of the bonding pads P1. In the present embodiment, each of the second electrodes E2 has four branches extending along the first direction D1, two of which forms one of the second openings OP1, and the other two forms another one of the second openings OP2. The second openings OP2 and the bonding pads P1 have similar rectangular shapes.

Furthermore, adjacent two of the bonding pads P1 are surrounded by two of the second openings OP2 and arranged along the first direction D1.

Referring to FIG. 11, which is a top view of one of the sensing cells according to the fourth embodiment of the present disclosure. The sensing cell SC of FIG. 11 has a rectangular shape captured from the sensing area SA of FIG. 10. The sensing cell SC can include two incomplete first electrode E1 each with a hollow half-hexagon shape and two incomplete second electrodes E2 each with a hat shape, the two incomplete first electrodes E1 are located at two sides of the sensing cell SC, and the two incomplete second electrodes E2 are located at other two sides of the sensing cell SC. In addition, in each of the sensing cells SC, the bonding pads P1 can be arranged to be adjacent to four corners of the rectangular shape, and the second dummy pads P2 can be arranged at two edges of the rectangular shape.

In the present embodiment, as shown in FIGS. 10 and 11, the lighting touchpad 1 further includes a plurality of first linking patterns LP1. Each of the first linking pattern LP1 extends along the first direction DI and used to couple adjacent two of the first electrodes E1 to each other.

As shown in FIG. 8, the lighting devices L1 are arranged at corners of the sensing cell SC while overlapping a part of the second electrodes E2. More specifically, each of the lighting devices L1 can be disposed across adjacent two of the sensing cells SC, and is connected to the two bonding pads P1.

In this embodiment, a part of the bonding pads P1 can serve as first dummy pads that are not connected to any of the lighting devices L1. That is, regardless of whether the lighting device L1 is provided in the sensing cells SC or not, the shape and configuration relationship of the bonding pads, the first dummy pads, the second dummy pads, the first electrodes, and the second electrodes remain the same. Such a sensing electrode layout can maintain the uniformity of each sensing cell SC after the lighting devices L1 are set, thereby ensuring basic capacitance and high sensing performance. Further, since the lighting devices L1 are located at the corners of the sensing cells SC, the impact of the lighting devices L1 on touch performance can be reduced.

Therefore, in the lighting touchpad 1 provided in the fourth embodiment, the uniformity of the sensor cells SC can be enhanced. That is, in each of the sensing cells SC, the first electrodes E1, the second electrodes E2 the bonding pads P1 and the second dummy pads P2 are arranged identically. In this way, high consistency of the sensor configuration can achieve uniform base capacitance values for the sensing cells, leading to improved touch sensing performance, such as linearity and jitter, and there is no need to sacrifice the consistency of the sensing cells to achieve a specific lighting effect.

Furthermore, by setting the first and second dummy pads, the shape and configuration relationship of the bonding pads, the second dummy pads, the first electrodes, and second electrodes remain the same. Such a sensing electrode layout can maintain the uniformity, thereby ensuring basic capacitance and high sensing performance. Furthermore, the dummy pads also assist in preserving the residual metal ratio (also known as the metal spreading rate), so as to avoid warpage issues due to varying residual metal ratio.

Fifth Embodiment

Figure 12:
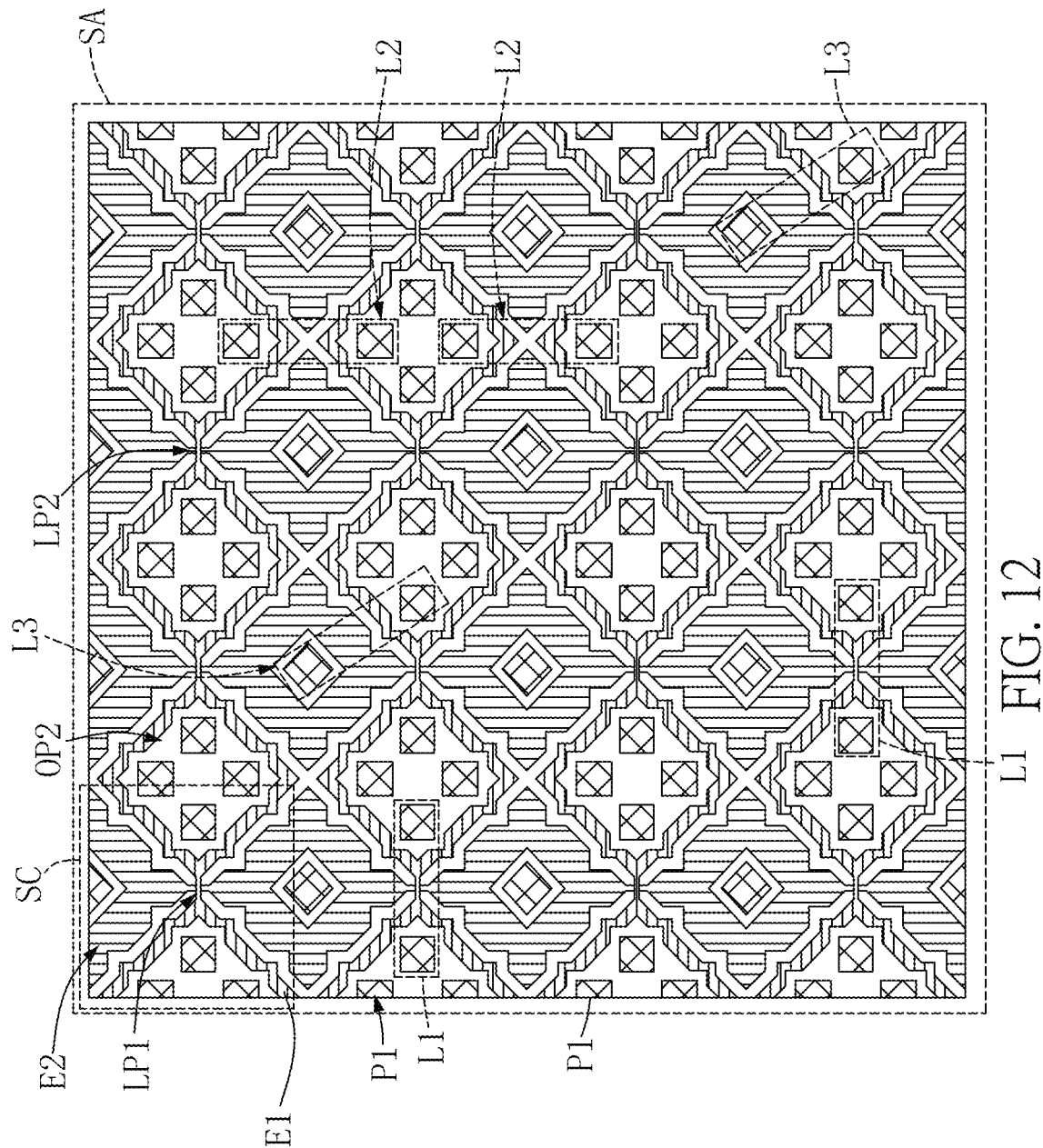
FIG. 12 is a top view of a sensing area of the lighting touchpad according to a fifth embodiment of the present disclosure.
Figure 13:
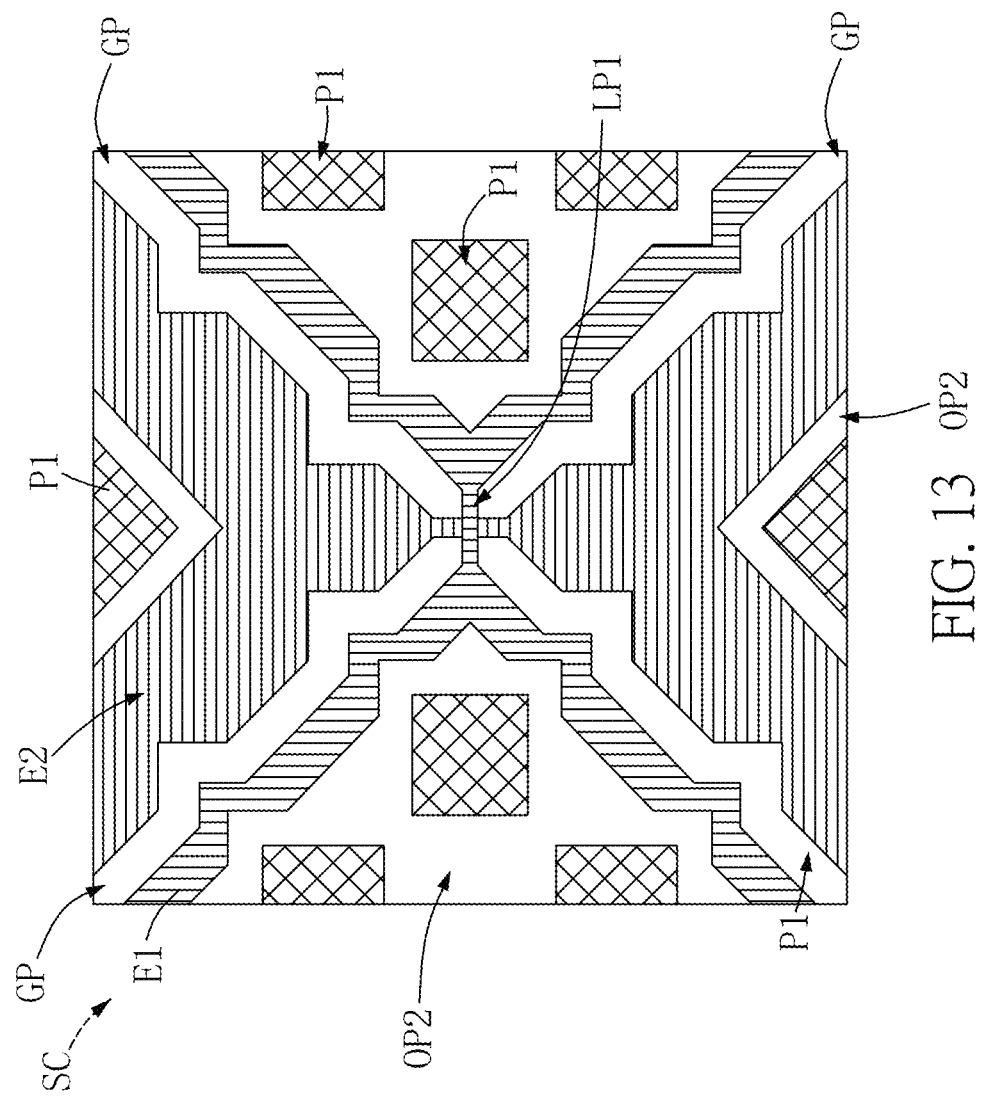
FIG. 13 is a top view of one of the sensing cells according to the fifth embodiment of the present disclosure.

Referring to FIGS. 12 and 13, a fourth embodiment of the present disclosure is similar to the first through third embodiments of the present disclosure. For the sake of brevity, descriptions of the same components in the first, second and third embodiments of the present disclosure will be omitted herein, and the following description only discloses different features between the first and second embodiments.

As shown in FIG. 12, a plurality of first electrodes E1, a plurality of second electrodes E2, and a plurality of bonding pads P1 are alternately arranged in a sensing area SA of the lighting touchpad 1 without overlapping with one another.

Similarly, the sensing area SA includes a plurality of sensing cells SC, and the first electrodes E1, the second electrodes E2, the bonding pads P1 and the second dummy pads P2 are arranged according to a predetermined spatial characteristic for each of the sensing cells SC.

Referring to FIG. 12, the first electrodes E1 are arranged and connected in series along a first direction D1, the second electrodes E2 are arranged and connected in series along a second direction D2 that is substantially perpendicular to the first direction D1. The first electrodes E1 and the second electrodes E2 have similar shapes, for example, the first electrodes E1 and the second electrodes E2 have hollow diamond-like shapes but with different hollow portion at the center thereof.

Referring to FIG. 12, each of the first electrodes E1 can be provided with one first opening OP1 for accommodating four of the bonding pads P1. In the present embodiment, each of the first openings OP1 is formed by combining one diamond shape and four rectangular shape adjacent to four corners of the diamond shape. The bonding pads P1 in one of the first openings OP2 have rectangular shapes, and are located at four corners of the first opening OP2.

Furthermore, each of the second electrodes E2 can be provided with one second opening OP1 for accommodating one of the bonding pads P1. In the present embodiment, each of the second electrodes E1 has one second opening OP1 that is located at the center of the hollow diamond-like shape, and the second opening OP1 and the corresponding bonding pad P1 have similar diamond-like shapes.

Referring to FIG. 13, which is a top view of one of the sensing cells according to the fifth embodiment of the present disclosure. The sensing cell SC of FIG. 13 has a rectangular shape captured from the sensing area SA of FIG. 12. The sensing cell SC can include two incomplete first electrode E1 each with a hollow half-diamond-like shape and two incomplete second electrodes E2 each with a half-diamond shape, the two incomplete first electrodes E1 are located at two sides of the sensing cell SC, and the two incomplete second electrodes E2 are located at other two sides of the sensing cell SC. In addition, in each of the sensing cells SC, the bonding pads P1 in the diamond shape can be arranged to be adjacent to two edges of the rectangular shape corresponding to the second electrodes E2, and the bonding pads P1 with rectangular shapes can be arranged in the two second openings OP2.

Similarly, at least one of the first electrodes E1 can be neighbored by N (e.g., 4) of the second electrodes E2 along N (e.g., 4) gaps GP, and N (e.g., 4) openings (e.g., OP1 and/or OP2) are existed in the N (e.g., 4) gaps GP, respectively. The bonding pads P1 can be located in the openings (e.g., OP1 and/or OP2), respectively, and N can be an integer that is equal to or larger than one.

In the present embodiment, as shown in FIGS. 12 and 13, the lighting touchpad 1 further includes a plurality of first linking patterns LP1 and a plurality of second linking patterns LP2. Each of the first linking pattern LP1 extends along the first direction D1 and used to couple adjacent two of the first electrodes E1 to each other. Each of the second linking pattern LP2 extends along the second direction D2 and used to couple adjacent two of the second electrodes E2 to each other.

As shown in FIG. 13, lighting devices L1, L2 and L3 are arranged in the sensing area SA with different orientations. More specifically, the lighting devices L1 are disposed along the first direction D1, the lighting devices L2 are disposed along the second direction D2, and the lighting devices L3 are disposed along a third direction different from the first direction D1 and the second direction D2.

For example, one of the lighting devices L1 is connected to two of the bonding pads P1 that are located in the hollow portions of different first electrodes E1 along the first direction D1. One of the lighting devices L2 is connected to two of the bonding pads P1 that are located in the hollow portions of different first electrodes E1 along the second direction D2. One of the lighting devices L3 is connected to the bonding pad P1 located at the center of one of the second electrodes E2 and one bonding pad P1 located in the hollow portion of one of the first electrodes E1, and is tilted with respect to the lighting devices L1 and L2. That is, the lighting devices L1, L2 and L3 can be arranged in different orientations without changing the arrangement of the first electrodes E1, the second electrodes E2 and the bonding pads P1, this provides flexibility for designing various light effects according to requirement.

In this embodiment, a part of the bonding pads P1 can serve as dummy pads that are not connected to any of the lighting devices L1, L2 and L3. That is, regardless of whether the lighting devices L1, L2 and L3 are provided in the sensing cells SC or not, the shape and configuration relationship of the bonding pads, the first electrodes, and the second electrodes remain the same. Such a sensing electrode layout can maintain the uniformity of each sensing cell SC after the lighting devices L1, L2 and L3 are set, thereby ensuring basic capacitance and high sensing performance.

Beneficial Effects of the Embodiments

In conclusion, in the lighting touchpad provided by the present disclosure, the uniformity of the sensor cells can be enhanced. That is, in each of the sensing cells, the electrodes and the bonding pads can be arranged identically. In this way, high consistency of the sensor configuration can achieve uniform base capacitance values for the sensing cells, leading to improved touch sensing performance, such as linearity and jitter, and there is no need to sacrifice the consistency of the sensing cells to achieve a specific lighting effect.

Furthermore, by setting the dummy pads, the shape and configuration relationship of the electrodes and the bonding pads remain the same. Such a sensing electrode layout can maintain the uniformity, thereby ensuring basic capacitance and high sensing performance. Furthermore, the dummy pads also assist in preserving the residual metal ratio (also known as the metal spreading rate), so as to avoid warpage issues due to varying residual metal ratio.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting touchpad, comprising:
a substrate;

a plurality of first electrodes arranged on the substrate;
a plurality of second electrodes arranged on the substrate;
a plurality of bonding pads arranged on the substrate, wherein the first electrodes, the second electrodes, and the bonding pads are alternately arranged in a sensing area without overlapping with one another; and
a plurality of lighting devices connected to a part of the bonding pads,
wherein the sensing area includes a plurality of sensing cells, and the first electrodes, the second electrodes and the bonding pads are arranged according to a predetermined spatial characteristic for each of the sensing cells;
wherein the first electrodes and the second electrodes have identical shapes; wherein each of the first electrodes has at least one first opening for accommodating one or more of the bonding pads, and each of the second electrodes has at least one second opening for accommodating one or more of the bonding pads.

2. The lighting touchpad according to claim 1, further comprising:
a plurality of first linking patterns coupling adjacent ones of the first electrodes; and
a plurality of second linking patterns coupling adjacent ones of the second electrodes,
wherein the second linking patterns are separated from the first linking patterns and partially overlapped with the first linking patterns, respectively.

3. The lighting touchpad according to claim 1, wherein the plurality of bonding pads include a plurality of dummy pads that are not connected to the lighting devices.

4. The lighting touchpad according to claim 1, wherein each of the first electrodes and the second electrodes has a diamond shape, and each of the first electrodes has the at least one first opening formed at an edge of the diamond shape, and each of the second electrodes has the at least one second opening formed at an edge of the diamond shape.

5. The lighting touchpad according to claim 4, wherein each of the first opening is arranged to face one of the second openings, and the bonding pads in each of the first opening and the corresponding second opening are arranged along the first direction or the second direction.

6. The lighting touchpad according to claim 1, wherein each of the sensing cells has a rectangular shape, and in each of the sensing cells, the bonding pads are arranged to be adjacent to four corners of the rectangular shape.

7. The lighting touchpad according to claim 6, wherein each of the lighting devices is connected to two of the bonding pads, and the lighting devices are arranged without overlapping with the first electrodes and the second electrodes.

8. The lighting touchpad according to claim 1, wherein each of the lighting devices is located between one of the first electrodes and one of the second electrodes.

* * * * *